US006571975B1

(12) United States Patent
Fay

(10) Patent No.: US 6,571,975 B1
(45) Date of Patent: Jun. 3, 2003

(54) LIDDED CONTAINER

(76) Inventor: Gary J Fay, 104 Jaybird Dr., Jonesborough, TN (US) 37659

( * ) Notice: Subject to any disclaimer, the term of this patent is extended or adjusted under 35 U.S.C. 154(b) by 133 days.

(21) Appl. No.: 09/654,610

(22) Filed: Sep. 1, 2000

Related U.S. Application Data

(60) Provisional application No. 60/152,080, filed on Sep. 2, 1999.

(51) Int. Cl.$^7$ ............................ B65D 25/28; B65D 43/02
(52) U.S. Cl. ........................ 220/379; 220/759; 220/768; 220/908
(58) Field of Search .............................. 220/573.1, 201, 220/212, 212.5, 379, 380, 908, 756, 744, 752, 287, 759, 768; 215/365, 366, 230, 228

(56) References Cited

U.S. PATENT DOCUMENTS

| | | | | |
|---|---|---|---|---|
| 245,635 A | * | 8/1881 | Jennings ...................... 220/379 |
| 278,563 A | * | 5/1883 | Lane ............................ 217/81 |
| 660,443 A | * | 10/1900 | Konkle ........................ 220/379 |
| 661,308 A | * | 11/1900 | Estes et al. ................. 126/261 |
| 793,962 A | * | 7/1905 | Roth ............................ 215/316 |
| 946,271 A | * | 1/1910 | Reeves ........................ 220/231 |
| 2,259,770 A | * | 10/1941 | Nove ........................... 220/379 |
| 3,015,405 A | * | 1/1962 | Sterling ........................ 217/56 |
| 3,121,438 A | * | 2/1964 | Kennedy ..................... 134/135 |
| 4,592,483 A | * | 6/1986 | Scouten ....................... 220/379 |
| 4,773,555 A | * | 9/1988 | Merino ........................ 220/379 |
| 4,957,216 A | * | 9/1990 | LaBarge ...................... 220/379 |
| 5,197,624 A | * | 3/1993 | Dodaro ...................... 220/254.3 |
| 5,301,857 A | * | 4/1994 | Green ......................... 215/365 |
| 5,720,555 A | * | 2/1998 | Elele ........................... 116/216 |
| 6,105,810 A | * | 8/2000 | Daenen et al. ............ 220/366.1 |
| 6,325,238 B1 | * | 12/2001 | Munari ........................ 220/759 |

* cited by examiner

Primary Examiner—Stephen K. Cronin
Assistant Examiner—Niki M. Eloshway
(74) Attorney, Agent, or Firm—Krieg DeVault Lundy, LLP

(57) ABSTRACT

A container has a lid which is supportable on the container in a first position covering the top opening of the container, and in a second position substantially perpendicular to the first position. The container lid features a centrally located undercut recess having an inclined recess positioned to rest on a rim of the container. The lid includes a raised ridge portion positioned in spaced relation between the undercut recess and an outer edge of the container lid. The raised ridge portion aids in supporting the container lid approximately perpendicular to the upper rim of portion the container. A handle may be secured to the undercut recess to aid in grasping the container lid. When the undercut recess extends from the outer surface of the container lid, the undercut recess may serve as the handle. The handle is grasped and the lid raised from the container, and the inclined recess is placed atop the upper rim portion of the container. A raised ridge portion on the container lid maintains the container lid in an upright position on the upper rim of the container. Multiple lids may be made nestable for ease of shipping, transport or storage.

20 Claims, 2 Drawing Sheets

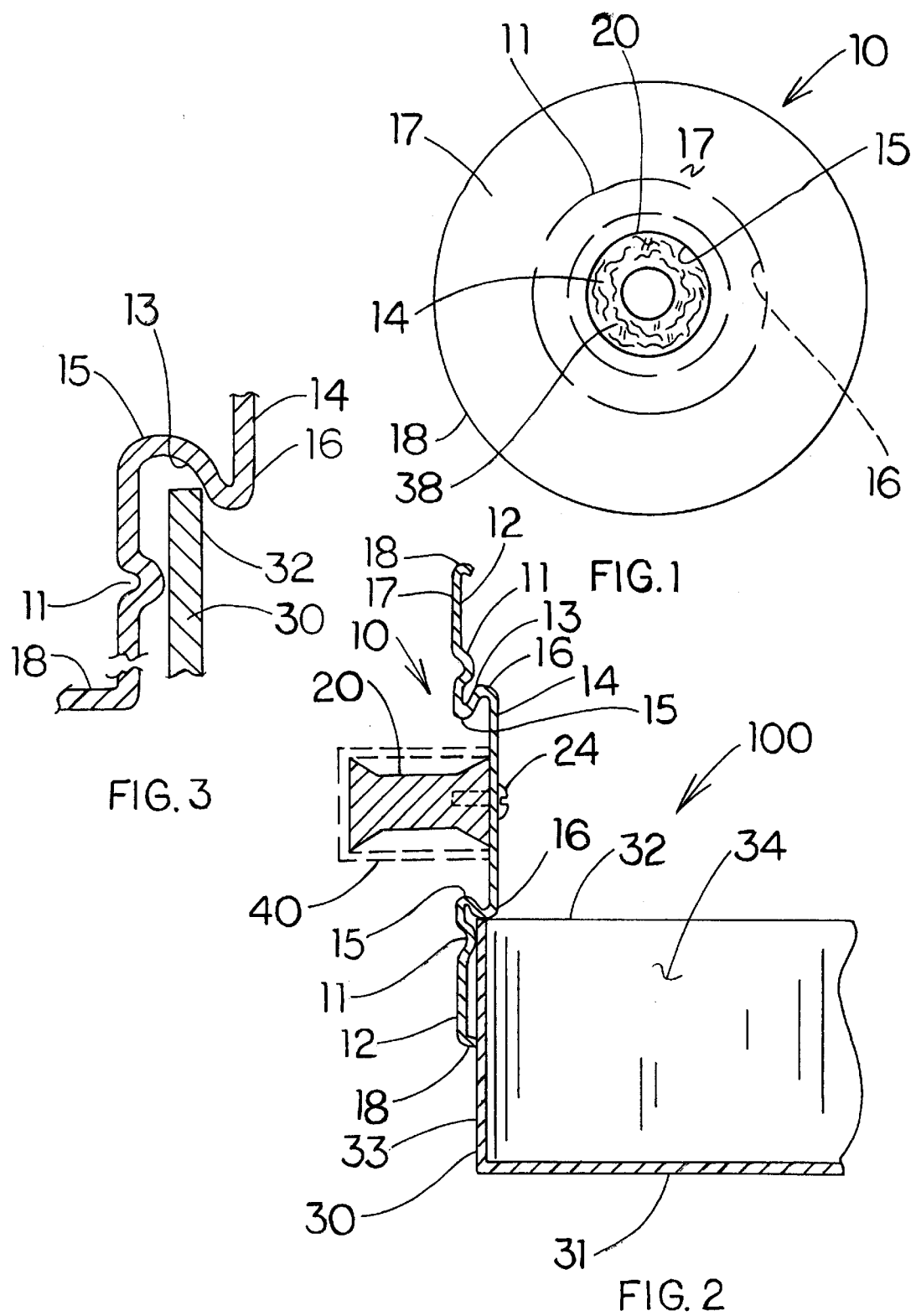

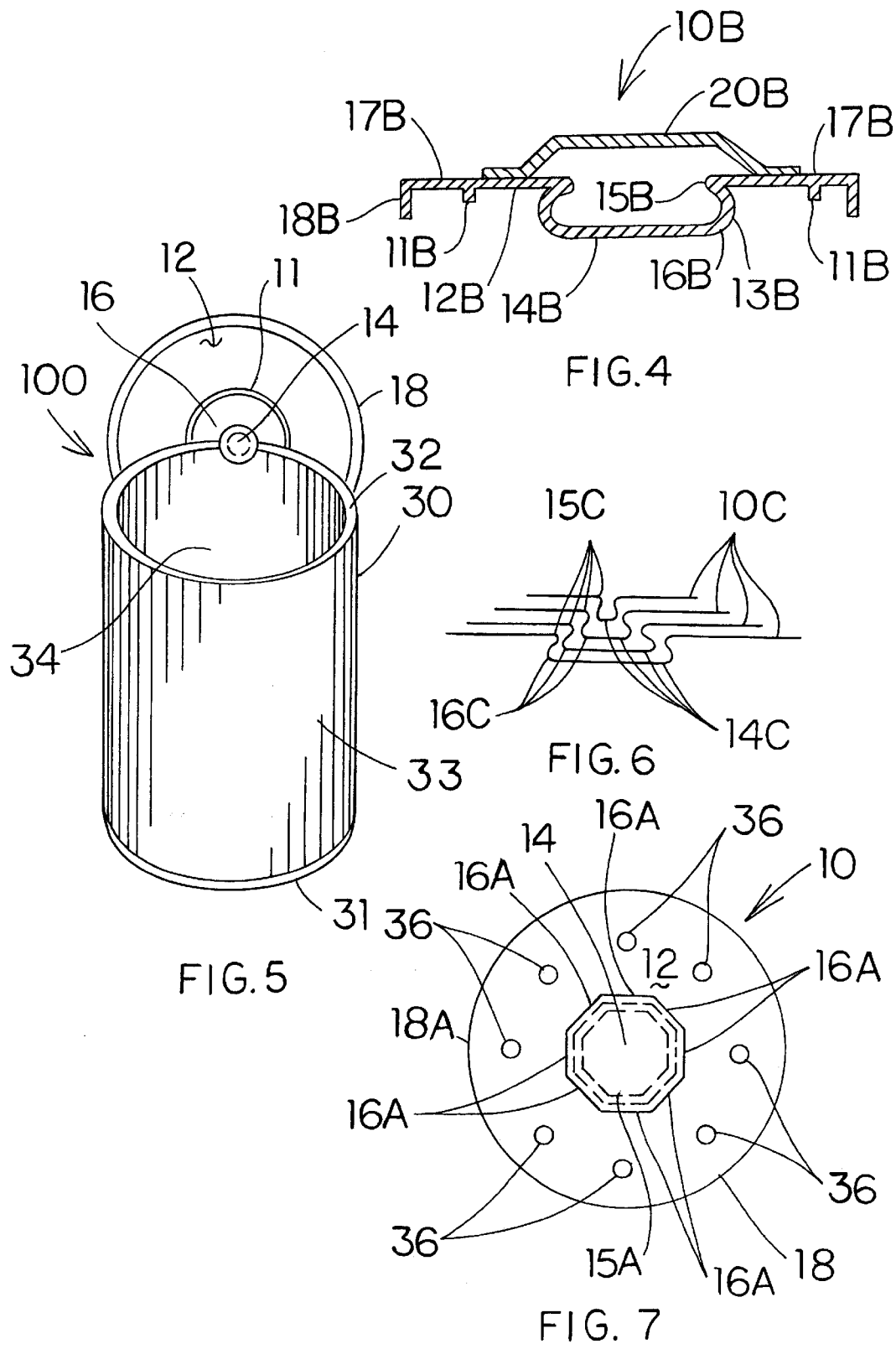

LIDDED CONTAINER

This application claims the benefit, pursuant to 35 U.S.C. §119(e), of the filing date of provisional application Ser. No. 60/152,080 filed Sep. 2, 1999, which is hereby incorporated by reference.

FIELD OF THE INVENTION

The present invention relates to lidded containers. More particularly, the invention relates to an improved lid structure for use with a container which is to be covered by the lid, for example canisters, pots for cooking, and trash cans.

BACKGROUND OF THE INVENTION

The use of lids for containers is well known. It is a problem in the art to provide a lidded container with a lid support arrangement which works efficiently, is economical to manufacture, and is easy to use.

In U.S. Pat. No. 4,978,022 to Weick, a piggyback microwave container is shown. The container has a lid which has a recess area, and can hold items.

U.S. Pat. No. 2,088,848 to Fay teaches a cooking utensil cover. The cover is a lid with a recessed area.

U.S. Pat. No. 4,592,483 to Scouten shows a container and separate cooperating lid. The lid has a recessed area which holds items.

U.S. Pat. No. 5,632,401 teaches a garbage container and liner dispensing system. A cylindrical container has a recess in the lower end thereof, which has an internal bag storage compartment.

In U.S. Pat. No. 5,167,351, a lid is shown which is connected to a barrel by integrally formed hinges. In this patent, however, the lid can only be opened in one direction.

Another type of trash barrel and lid arrangement is shown in U.S. Pat. No. 4,789,078. The lid has a sliding pivot action guided and supported on the trash barrel, and permits opening only in a single direction.

U.S. Pat. No. 5,251,775 discloses a sliding pivot action lid. The lid is guided by parallel rails mounted on the trash barrel. The lid can be opened and closed in only a single direction.

SUMMARY OF THE INVENTION

From the foregoing, it is seen that it is a problem in the art to provide a device meeting the above requirements. According to the present invention, a device is provided which meets the aforementioned requirements and needs in the prior art. Specifically, the device according to the present invention provides a container and cooperating lid which works efficiently, is economical to manufacture, and is easy to use.

Specifically, the device according to the present invention includes a container and a lid therefor. The lid is supportable on the container in a first position covering the top opening of the container, and in a second position substantially perpendicular to the first position, with a raised central portion resting on a rim of the container.

The lid according to the present invention includes an undercut portion, a rim, a handle, and a ridge. To rest the lid on the rim of the container, the handle is grasped and the lid raised from the container, and the rear of the undercut portion of the handle is placed atop the rim of the container. The ridge of the lid maintains the lower edge of the lid at a spaced distance from the container, and helps maintain the lid in an upright position.

In a first alternative embodiment, an additional projection is provided on the rear of the undercut portion. The additional projection provides another way of resting the lid on the rim of the container, and is especially useful when resting the lid on a container which does not exactly match the lid and has, for example, a bent rim, a curved rim, or especially thick walls.

In another embodiment of the invention, the handle portion overlies the recess, so that the recess serves to permit grasping of the handle portion without contacting the surface of the lid. This is especially useful where the lid may be hot, for example in cooking.

Other objects and advantages of the present invention will be more readily apparent from the following detailed description when read in conjunction with the accompanying drawings.

BRIEF DESCRIPTION OF THE DRAWINGS

FIG. 1 is a top elevational view of a lid according to the present invention.

FIG. 2 is a sectional side view of the lid of FIG. 1 resting on a rim of a container.

FIG. 3 is an enlarged cross-sectional view of a central portion of the container shown in FIG. 2.

FIG. 4 is a sectional side view of a lid similar to that of FIG. 2, with a handle, which bridges an undercut portion of the lid.

FIG. 5 is a perspective view of a garbage can lid supported on the lip of a garbage can.

FIG. 6 schematically illustrates a nesting arrangement of lids similar to that shown in FIG. 5, with the handles removed.

FIG. 7 is a bottom elevational view of the lid, showing flats on the raised portion and a plurality of spaced bumps positioned circumferentially about the raised portion.

DETAILED DESCRIPTION OF THE INVENTION

As shown in FIG. 1 through FIG. 7, a container lid 10 has an inner surface 12, an outer surface 17, a raised ridge portion 11, an optional handle 20, and an undercut recess 14 forming an inclined recess (13) therebetween. The inclined recess 13 extends between an inner edge 15, and an outer edge 16 formed by the undercut recess 14. The lid 10 further has an outer rim portion 18 sized to fit over the upper rim portion 32 of a container 30. The outer rim portion 18 may extend inwardly, as shown in FIG. 2, or outwardly as shown in FIG. 3.

The container 30 may be a pot or pan used for cooking, or may alternately be a trash container, or a container for bulk material, such as dry dog food, condiments, or other bulk supplies. The lidded container apparatus 100 disclosed herein is very useful where the container lid 10 is frequently removed to access the contents of the container 30, and where space to place the container lid 10 while accessing the container 30 is at a premium.

As shown in FIG. 2, the container 30 comprises a bottom portion 31 joined to a raised wall portion 33. The raised wall portion 33 extends to an upper rim portion 32, forming an open topped chamber 34 therebetween.

The container lid 10 includes a ridge 11 which extends in spaced relation about the undercut recess 14. The raised ridge portion 11 preferably comprises a continuous ridge 11 extending circumferentially in spaced relation about the undercut recess 14. Alternately, the raised ridge portion 11 may be formed as a series of spaced bumps, or protrusions 11a positioned circumferentially in spaced relation about the undercut recess 14, as shown in FIG. 7.

The container lid 10 is preferably formed of at least one of: metal, ceramic, glass or plastic material. A handle 20 is preferably secured to the undercut recess 14 as shown in FIG. 2, or may alternatively be secured to the container lid 10 on each side of the undercut recess 14, as shown in FIG. 4. The handle is preferably made of an insulating material such as Bakelite™ or Zeolite™, for example. However, other materials, such as plastic or metal, can be used for the handle 20.

FIG. 2, FIG. 3 and FIG. 5 illustrates the lid 10 mounted in an open position substantially perpendicular to the container 30. The container 30 has an upper rim portion 32. The lid 10 can be placed horizontally upon the upper rim portion 32 of the container 30 in a conventional manner, for example, for cooking or storage. When the lid 10 is removed from atop the container 30, it may be placed substantially vertically on the upper rim portion 32 of the container 30 as shown in FIG. 2, FIG. 3, and FIG. 5. The upper rim portion 32 of the container 30 rests between the inner edge 15 and the outer edge 16 of the undercut recess 14, when placed upon the upper rim portion 32 of the container 30. The raised ridge portion 11 serves to place the container lid 10 in a substantially vertical alignment with the upper rim portion 32 of the container. The raised ridge portion 11 thus serves to limit the amount of tilting of the lid 10, and prevents contact of the inner surface 12 with the container 30 at any location except at the ridge 11 and the rim 18. The ridge 11 further serves to keep the other portions of the lid 10 from touching or scraping the side of the pot or pan during use.

As seen in FIG. 2, an optional handle 20 is preferably affixed to the undercut recess 14 by a threaded fastener 24, or by other known fastening means. The undercut portion 14 is formed as a relatively flat portion of a size substantially smaller than the outer rim portion 18 of the container lid 10. While generally planar surfaces are shown, it will be understood that these surfaces may be curved, bent, or angled without departing from the scope of the present invention. Also, while a threaded fastener 24 is shown, it will be understood that all other known means of attaching a handle to a lid are contemplated as being within the scope of the present invention.

FIG. 3 is an enlarged view of a portion of FIG. 2, showing the upper rim portion 32 of the container 30. While specific proportions are shown for the undercut recess 14, other proportions may be used, for example, to permit a deeper or shallower depth of insertion of the upper rim portion 32 into the recess formed between the inner edge 15 and the outer edge 16, or to accommodate an upper rim portion 32 which is thicker or thinner than illustrated. The alternate embodiment of the container lid 12, shown in FIG. 6, is also considered to be a novel feature of this invention. In this embodiment, multiple containers 30 each have complimentary sized container lids 10 with each respective undercut recess 14 selectively sized to be nestable in relation to the undercut recess 14 of an adjacent container lid 10 for ease of shipping and storage.

The undercut recess portion 14 shown in FIG. 7 comprises an outer edge 16 having a plurality of flats 16a, which serve to resist the rolling actuation of the lid 10 on the rim 32 of the container 30, when the container 30 is moved during use. Alternatively, the circular ridge 11 shown in FIG. 1 may be replaced with a plurality of spaced bumps or protrusions 36 positioned circumferentially about the raised portion 14 of the lid 10. The spaced bumps or protrusions 36 serve the same function as the raised ridge portion 11, previously disclosed herein. All such variations are contemplated as being within the scope of the present invention.

The inclined recess 13 of the undercut recess portion 14 engages the rim 32 of the container 30 to support the lid 11 approximately perpendicular to the rim 32. As shown in FIG. 2 and FIG. 3, the undercut recess 14 on the inner surface 12 of the container lid 10 includes an inclined recess 13 extending between the outer edge 16 and the inner edge 15 of the raised portion 14. To support the container lid 10 upon the upper rim portion 32 of the container 30, the outer edge 16 of the container lid 10 is placed inside the rim 32, while the inner edge 15 is positioned outside the rim 32. Ridge 11 and outer lip 18 serve to position the lid 10 approximately perpendicular to the rim 32 of the container, with the inside surface 12 of the lid 10 facing towards the container 30 and the outer surface 17 of the lid 10 facing away from the container 30. This aids in allowing at least some of the moisture, which at times collects on the inside surface 12 of the container lid 10, to drip back into the container 30.

The container lid 10 may be placed upon the upper rim portion 32 of the container 30 to retain heat and steam within the container 30 during the cooking process; while allowing the container lid 10 to be conveniently placed perpendicular to the container rim 32 for ease of access into the open topped chamber 34 located within the container 30. This eliminates the need for extra counter space (not shown) to place the container lid 10 when accessing the contents within the container 30. Note: there is rarely enough counter space in a busy kitchen.

FIG. 3 is a partial, enlarged cross sectional view of a lid 11 positioned upon the upper rim portion 32 of a container 30. The raised portion 14 may serve as a handle, eliminating the need for a separate handle 20 as shown in FIG. 2. In this embodiment, the outer rim 18 would face away from the raised portion 14 as shown in FIG. 3. The inclined recess 13 extending between the outer edge 16 and the inner edge 15 of the raised portion 14 engages the rim 32 of the container 30 to support the lid 10 approximately perpendicular to the rim 32. The undercut recess 14 forms an inclined recess 13 having an outer edge 16 and an inner edge 15. The outer edge 16 is placed inside the rim 32, while the inner edge 15 is placed outside the rim 32. Ridge 11 serves to position the lid 10 approximately perpendicular to the rim 32 of the container, with the inside surface 12 of the lid 10 and the outer rim portion 18 facing away from the container 30. In this embodiment, a separate handle 20 is not needed.

FIG. 4 is a side sectional view of a lid 10B similar to the lid 10 shown in FIG. 2, with a handle 20B secured to the outer surface 17B of the container lid 10B. In this embodiment, the handle 20B bridges the undercut recess 14B located on the outer surface 17B of the lid 10B. In this embodiment, the undercut recess 14B extends from the inner surface of the container lid 10B in the same direction as the outer rim portion 18B.

The ridge 11B serves the same purpose as that of the ridge 11 of FIG. 2. Variations in the shape of the ridge 11B, and in the materials used therefor, are all contemplated as being within the scope of the present invention.

FIG. 6 schematically illustrates a nesting arrangement of lids 10C similar to that shown in FIG. 5, with the optional handles 20C removed therefrom. As seen in FIG. 6, the lids 10C are sized so that they can be nested, for example for storage or shipping.

As another alternative embodiment, a portion of the handle 20 shown in FIG. 2 can be composed of thermochromic material, which changes color depending upon its temperature. In a preferred embodiment, the thermochromic material is a coating on at least the uppermost surface of the handle which changes to another color, for example red, when the temperature of the handle 20 exceeds a predetermined temperature, such as 130 degrees Fahrenheit. This serves as a useful warning when cooking, for example.

Also, in another alternative embodiment, a sleeve or cover can be selectively placed upon the handle 20, and having a color different from that of the handle 20, so that the color can be used as a signal or indicator of the contents, state, or status of the container 30. For example, a blue colored cover or sleeve can indicate that the container is full, and a yellow cover or sleeve can be used to indicate that the container contains contaminated material such as medical waste, etc.

The lidded container disclosed herein, is not limited for use with cooking containers. For example, garbage can lids, may include a raised portion 14 having an inclined recess 13 extending between the inner edge 15 and the outer edge 16 of the raised portion 14, as shown in FIG. 6. The undercut recess 14 located in the center of the container lid 10 may be large enough to store one or more flexible plastic bags to line the garbage can. This eliminates the need to stoop to place or pick up the garbage can lid 10 from the ground, as the garbage can lid 10 may be positioned perpendicular to the upper rim portion 32 of the container 30, when accessing the open topped chamber 34 located within the container 30.

The lidded container apparatus 100 disclosed herein, may also be used for other purposes, such as on containers for storing pet food, grain, feed, or other supplies which are stored in a lidded container.

The invention being thus described, it will be evident that the same may be varied in many ways. Such variations are not to be regarded as a departure from the spirit and scope of the invention and all such modifications are intended to be included within the scope of the claims.

I claim:

1. A lidded container apparatus, which comprises: a) a container (30) having a bottom portion (31) joined to a raised wall portion (33) having an upper rim portion (32) at the top of the raised wall portion (33), the bottom portion (31) and the raised wall portion (33) forming an open topped chamber (34) therebetween; b) a container lid (10) with an outer surface (17) and an inner surface (12), an undercut recess (14) centrally located upon the container lid (10) forming an inclined recess (13) located between an inner edge (15) and an outer edge (16) of the undercut recess (14), an outer rim portion (18) sized to be received about the upper rim portion (32) of the container (30), and a raised portion (11) positioned in spaced relation between the undercut recess (14) and the outer rim portion (18); and the outer rim portion (18) of the container lid (10) may be selectively placed about the upper rim portion (32) of the container (30) to enclose the open topped chamber (34), and the container lid (10) may be selectively positioned adjacent to the raised wall portion (33) of the container (30), with the inclined recess (13) of the undercut recess (14) placed upon the upper rim portion (32) of the container (30) to temporarily store the container lid (10) while providing access to the open topped chamber of the container (30).

2. The lidded container apparatus of claim 1, wherein multiple containers (30) each have complimentary sized container lids (10) with each respective centrally located undercut recess (14) sized to be nestable in relation to the undercut recess (14) of an adjacent container lid (10) for ease of shipping and storage.

3. The lidded container apparatus of claim 1, wherein a handle (20) is secured to the undercut recess (14) of the container lid (10), for ease of grasping and holding the container lid (10) during use.

4. The lidded container apparatus of claim 3, wherein the handle (20) is at least partially coated with a thermo-chromic material which changes color to indicate its present temperature.

5. The lidded container apparatus of claim 4, wherein the handle (20) secured to the container lid (10) is made of an insulating material selected from one of: Bakelite and Zeolite type materials.

6. The lidded container apparatus of claim 3, wherein a color coded sleeve (40) is selectively placed over the handle (20) to indicate the contents, state, or status of the container (30).

7. The lidded container apparatus of claim 1, wherein the centrally located undercut recess (14) in the container lid (10) is sized to store one or more flexible plastic bags (38) of a size suitable for use with the container (30).

8. The lidded container apparatus of claim 1, wherein the raised ridge portion (11) on the container lid (10) is a continuous concentric raised ridge portion extending in spaced relation between the undercut recess (14) and the outer rim portion (18) of the container lid (10).

9. The lidded container apparatus of claim 1, wherein the raised ridge portion (11) is a series of spaced protrusions (36) positioned circumferentially in spaced relation between the undercut recess (14) and the outer rim portion (18) of the container lid (10).

10. The lidded container apparatus of claim 1, wherein the container lid (10) may be made of a material selected from at least one of: metal, ceramic, glass and plastic material.

11. The lidded container apparatus of claim 1, wherein the handle (20) located on the container lid (10) is at least partially coated with a thermo-chromic material which changes color to indicate its present temperature.

12. A lidded container apparatus, which comprises:
   a) a container (30) having a bottom portion (31) joined to a raised wall portion (33) having an upper rim portion (32) at the top of the raised wall portion (33), the bottom portion (31) and the raised wall portion (33) forming an open topped chamber (34) therebetween;
   b) a container lid (10) with a centrally located undercut recess (14) having an inner edge (15) and an outer edge (16) forming an inclined recess (13), an outer rim portion (18) sized to be received about the upper rim portion (32) of the container (30), and a raised ridge portion (11) extending between the undercut recess (14) and the outer rim portion (18) of the container lid (10); and
   c) a handle (20) is secured to the undercut recess (14) of the container lid (10), for ease of grasping and holding the container lid (10) during use; and
   the outer rim portion (18) of the container lid (10) may be selectively placed about the upper rim portion (32) of the container (30) to enclose the open topped chamber (34), and the container lid (10) may be selectively vertically placed adjacent to the raised wall portion (33) of the container (30), with the inclined recess (13) located between the inner edge (15) and the outer edge of the (16) undercut recess (14) placed upon the upper rim portion (32) of the container (30) to temporarily store the container lid (10) to provide access to the open topped chamber (34) of the container (30).

13. The lidded container apparatus of claim 12, wherein multiple containers (30) each have complimentary sized container lids (10) with each respective centrally located undercut recess (14) sized to be nestable in relation to the undercut recess (14) of an adjacent container lid (10) for ease of shipping and storage.

14. The lidded container apparatus of claim 12, wherein a color coded sleeve (40) is selectively placed over the handle (20) of the container lid (10) to indicate the contents, state, or status of the container (30).

15. The lidded container apparatus of claim 12, wherein the centrally located undercut recess (14) on the container lid (10) is sized to store one or more flexible plastic bags (38) of a size suitable for use within the container (30).

16. The lidded container apparatus of claim 12, wherein the raised ridge portion (11) of the container lid (10) is a continuous concentric raised ridge portion extending in spaced relation between the centrally located undercut recess (14) and the outer rim portion (18).

17. The lidded container apparatus of claim 12, wherein the raised ridge portion (11) of the container lid (10) is a series of spaced protrusions (36) positioned circumferentially in spaced relation between the undercut recess (14) and the outer rim portion (18) of the container lid (10).

18. The lidded container apparatus of claim 12, wherein the container lid (10) may be made of a material selected from at least one of: metal, ceramic, glass and plastic material.

19. The lidded container apparatus of claim 12, wherein the handle is made of an insulating material selected from one of: Bakelite and Zeolite type materials.

20. A lidded container apparatus, which comprises:

a) a container (30) having a bottom portion (31) joined to a raised wall portion (33) having an upper rim portion (32) at the top of the raised wall portion (33), the bottom portion (31) and the raised Wall portion (33) forming an open topped chamber (34) therebetween;

b) a container lid (10) with a centrally located undercut recess (14) having an inner edge (15) and an outer edge (16) forming an inclined recess (13) therebetween, and an outer rim portion (18) sized to be received about the upper rim portion (32) of the container (30), the container lid further having a raised ridge portion (11) extending between the undercut recess (14) and the outer rim portion (18); and c) a handle (20) secured to the undercut recess (14) of the container lid (10), for ease of grasping the container lid (10) during use, and the handle (20) is at least partially coated with a thermo-chromic material which changes color to indicate its present temperature, and the container lid (10) may be selectively placed upon the upper rim portion (32) of the container (30) to enclose the open topped chamber (34), and the container lid (10) may be selectively placed adjacent to the raised wall portion (33) of the container (30), with the inclined recess (13) located between the inner edge (15) and the outer edge of the (16) undercut recess (14),and the inclined recess (13) placed upon the upper rim portion (32) of the container (30) to temporarily store the container lid (10) while accessing the open topped chamber of the container (30).

* * * * *